US012301590B2

(12) United States Patent
Bailey et al.

(10) Patent No.: US 12,301,590 B2
(45) Date of Patent: May 13, 2025

(54) ENDPOINT SECURITY SYSTEMS AND METHODS WITH TELEMETRY FILTERS FOR EVENT LOG MONITORING

(71) Applicant: OPEN TEXT HOLDINGS, INC., San Mateo, CA (US)

(72) Inventors: Michael James Bailey, Pasadena, CA (US); Jacob Harris Therrien, Los Angeles, CA (US); James Daniel DeMarchi, La Cañada Flintridge, CA (US)

(73) Assignee: OPEN TEXT HOLDINGS, INC., Menlo Park, CA (US)

( * ) Notice: Subject to any disclaimer, the term of this patent is extended or adjusted under 35 U.S.C. 154(b) by 546 days.

(21) Appl. No.: 17/483,676

(22) Filed: Sep. 23, 2021

(65) Prior Publication Data
US 2022/0094703 A1    Mar. 24, 2022

Related U.S. Application Data

(60) Provisional application No. 63/082,430, filed on Sep. 23, 2020.

(51) Int. Cl.
*H04L 9/40*    (2022.01)
*H04L 9/32*    (2006.01)

(52) U.S. Cl.
CPC ................ *H04L 63/1416* (2013.01)

(58) Field of Classification Search
CPC ...... H04L 63/1416; H04L 63/00; H04L 43/00
See application file for complete search history.

(56) References Cited

U.S. PATENT DOCUMENTS

| 8,875,158 | B2* | 10/2014 | Zhang | G06F 9/542 719/318 |
| 9,171,002 | B1* | 10/2015 | Mam | G06F 3/0619 |
| 9,529,692 | B2* | 12/2016 | Stone | G06F 11/3476 |

(Continued)

OTHER PUBLICATIONS

Sysmon v13.30, retrieved from <<https://docs.microsoft.com/en-us/sysinternals/downloads/sysmon>> on Dec. 3, 2021, 17 pages.

(Continued)

*Primary Examiner* — Gary S Gracia
(74) *Attorney, Agent, or Firm* — Sprinkle IP Law Group

(57) ABSTRACT

An endpoint agent is enhanced with a kernel-level event tracing facility, an event manager having telemetry filters, a persistence manager, and a detection engine. The endpoint agent receives an instruction from a controller system to enable a selection of filters, including a custom-built telemetry filter for the kernel-level event tracing facility which feeds events to the event manager as they are occurring. The event manager determines which enabled telemetry filters are applicable to the events, apply them to identify events of interest, and provide those events to the detection engine which, in turn, applies detection filters to the events of interest to detect possible threats to the endpoint. The telemetry filters are evaluated in memory as the events are occurring. To increase the speed of processing, expression trees representing the telemetry filters can be compiled into machine code just in time of execution. The machine code executes extremely fast natively.

16 Claims, 16 Drawing Sheets

(56) References Cited

U.S. PATENT DOCUMENTS

| | | | | |
|---|---|---|---|---|
| 10,333,898 | B1* | 6/2019 | Moore | H04L 63/0236 |
| 10,574,674 | B2* | 2/2020 | Jee | H04L 63/1416 |
| 10,630,704 | B1* | 4/2020 | Ghosh | H04L 63/1416 |
| 10,887,337 | B1* | 1/2021 | Kim | H04L 63/1433 |
| 11,163,618 | B1* | 11/2021 | Wei | G06F 16/16 |
| 2013/0232576 | A1* | 9/2013 | Karnikis | G06F 21/53 |
| | | | | 726/24 |
| 2014/0109112 | A1* | 4/2014 | Zhang | G06F 11/3466 |
| | | | | 719/318 |
| 2014/0298107 | A1* | 10/2014 | Dreyfoos | G06F 11/0793 |
| | | | | 714/39 |
| 2015/0067859 | A1* | 3/2015 | Katz | H04L 63/1408 |
| | | | | 726/23 |
| 2015/0365438 | A1* | 12/2015 | Carver | H04L 63/1441 |
| | | | | 726/1 |
| 2016/0041894 | A1* | 2/2016 | Reid, III | G06F 11/3636 |
| | | | | 714/45 |
| 2017/0063907 | A1* | 3/2017 | Muddu | G06N 20/00 |
| 2017/0249357 | A1* | 8/2017 | Adler | G06F 16/13 |
| 2017/0364347 | A1* | 12/2017 | Adler | G06F 16/119 |
| 2017/0364353 | A1* | 12/2017 | Adler | G06F 9/44505 |
| 2017/0374086 | A1* | 12/2017 | Jeong | H04L 63/145 |
| 2018/0351979 | A1* | 12/2018 | Mandrychenko | G06F 16/1734 |
| 2019/0354391 | A1* | 11/2019 | Karyakin | G06F 9/45516 |
| 2019/0379699 | A1* | 12/2019 | Katragadda | H04L 63/1425 |
| 2020/0117757 | A1* | 4/2020 | Yanamandra | H04L 41/5064 |
| 2020/0287920 | A1* | 9/2020 | Mandrychenko | H04L 67/5651 |
| 2020/0342134 | A1* | 10/2020 | Kim | G06F 21/6245 |
| 2021/0029004 | A1* | 1/2021 | Wang | H04L 69/22 |
| 2021/0144178 | A1 | 5/2021 | Bailey | |
| 2021/0144517 | A1* | 5/2021 | Guim Bernat | H04L 9/3247 |
| 2021/0200533 | A1* | 7/2021 | Gage | G06F 8/71 |
| 2021/0406150 | A1* | 12/2021 | Sneed | G06F 11/3438 |
| 2022/0083646 | A1* | 3/2022 | Traktirnik | G06F 21/53 |
| 2022/0094703 | A1* | 3/2022 | Bailey | H04L 63/1416 |
| 2022/0174012 | A1* | 6/2022 | Deshmukh | H04L 43/12 |

OTHER PUBLICATIONS

Autoruns for Windows v14.06, retrieved from <<https://docs.microsoft.com/en-us/sysinternals/downloads/autoruns>> on Dec. 3, 2021, 6 pages.

RegRipper 3.0, retrieved from <<https://github.com/keydet89/RegRipper3.0/blob/master/README.md >> on Dec. 3, 2021, 2 pages.

Splunk-ETW, retrieved from <<https://github.com/airbus-cert/Splunk-ETW#readme>> on Dec. 2021, 15 pages.

Configure Winlogbeat, retrieved from <<https://www.elastic.co/guide/en/beats/winlogbeat/current/configuration-winlogbeat-options.html#configuration-winlogbeat-options-event logs-name>>, on Dec. 3, 2021, 9 pages.

* cited by examiner

| FILTER MANAGEMENT | | |
|---|---|---|
| ☐ Name ↑ 🔍 | Custom ↑▽ | Description 🔍 |
| ▸ Anomaly Detection | | |
| ▸ Persistence Technique | | |
| ▾ Telemetry | | |
| ☐ [Template] Directory reads | (RT) | High Volume This filter captures directories that have had the list of files within them enumerated. This is a hig |
| ☐ [Template] File reads | (RT) | High Volume This filter captures all files that have been read. This is a high volume, template filter, so you'll wa |
| ☐ [Template] Registry key opens | (RT) | High Volume This filter captures registry keys opened. This is a high volume, template filter, so you'll want to m |
| ☐ Anomaly activity | (RT) | This captures anomaly detection rule hits |
| ☐ Authentication activity | (RT) | All authentication activity captured |
| ☐ Connection activity | (RT) | TCP and UDP network connection activity |
| ☐ Directory changes | (RT) | Directories that have been created, deleted or renamed |
| ☐ Dll activity | (RT) | DLLs that have been loaded by a particular process |
| ☐ DNS activity | (RT) | DNS queries captured |
| ☐ Driver activity | (RT) | Kernel mode drivers that have been loaded |
| ☐ File changes | (RT) | Files created, deleted, renamed or that have had their contents changed. |
| ☐ File Deletion | (RT) | References: MITRE ATT&CKT1107 Tactics: Defense Evasion This filter specifically looks for binary and script fi |
| ☐ Handle activity | (RT) | Occurs when a process opens a handle to a process or thread. |

FIG. 2A

| FILTER MANAGEMENT | | |
|---|---|---|
| ☐ : Name ↑ 🔍 | Custom ↑ ▽ | Description 🔍 |
| ▶ Anomaly Detection | | |
| ▶ Persistence Technique | | |
| ▼ Telemetry | | |
| ☐ ⋮ [Template] Directory reads | (RT) | High Volume This filter captures directories that have had the list of files within them enumerated. This is a hig |
| ☐ ⋮ [Template] File reads | (RT) | High Volume This filter captures all files that have been read. This is a high volume, template filter, so you'll wa |
| ☐ ⋮ [Template] Registry key opens | (RT) | High Volume This filter captures registry keys opened. This is a high volume, template filter, so you'll want to m |
| ☐ ⋮     Edit    tivity | (RT) | This captures anomaly detection rule hits |
| ☐ ⋮     Delete   ion activity | (RT) | All authentication activity captured |
| ☐ ⋮     Copy    activity | (RT) | TCP and UDP network connection activity |
| ☐ ⋮     View     changes | (RT) | Directories that have been created, deleted or renamed |
| ☐ ⋮ Dll activity | (RT) | DLLs that have been loaded by a particular process |
| ☐ ⋮ DNS activity | (RT) | DNS queries captured |
| ☐ ⋮ Driver activity | (RT) | Kernel mode drivers that have been loaded |
| ☐ ⋮ File changes | (RT) | Files created, deleted, renamed or that have had their contents changed. |
| ☐ ⋮ File Deletion | (RT) | References: MITRE ATT&CK T1107 Tactics: Defense Evasion This filter specifically looks for binary and script fi |
| ☐ ⋮ Handle activity | (RT) | Occurs when a process opens a handle to a process or thread. |

Copy Telemetry Filter

Name
Authentication activity - Copy

Description

⊖ AND ⊙            ADD RULE    ADD GROUP (RT) ▽   equals ▽   Event Log Item ▽     ✕

Telemetry / Type (RT) ▽   equals ▽   Security ▽     ✕

Event Log Item / Log Name (RT) ▽   equals ▽   4624     ✕
                       4625
                       4768
                       4769

Event Log Item / Event ID

CANCEL    COPY

*(Rotated UI mockup)*

Copy Telemetry Filter

Name
Authentication activity - Copy

Description

AND ⊖

Telemetry / Type  (RT)

Enter search text    SEARCH

- Connection
- DLL
- Directory
- Event Log Item
- File
- Process
- Registry Key
- Telemetry
- Thread Data    (RT) ▲
Event ID    (RT)
Keywords    (RT)
Level    (RT)
Log Name    (RT)
Logged    (RT)
Message    (RT)
Opcode    (RT)
Source    (RT)
Task Category    (RT)

ADD RULE    ADD GROUP

▷ Event Log Item    ✕

▷    ✕

▷ Security    ✕

4624
4625
4768
4769
    ✕

CANCEL    COPY

Copy Telemetry Filter

Name:
Authentication activity - Copy

Description

Event Log Item / Event ID  (RT) ▷ equals  ▷  4624
4625
4768
4769

Event Log Item / Data / Name  (RT) ▷ in  ▷  Foo

⊖ OR ○    Select field ▷

ADD RULE    ADD GROUP

CANCEL    COPY

Copy Telemetry Filter

Name

[Template] Registry key opens - Copy

Description

AND

| | | |
|---|---|---|
| Telemetry / Type | (RT) ▷ equals ▷ | Registry Key ▷ ✕ |
| Telemetry / Action | (RT) ▷ equals ▷ | Open ▷ ✕ |
| Registry Key / Path (With Hive) | (RT) ▷ in ▷ | HKEY_LOCAL_MACHINE\Software\Foo ▷ ✕ |

ADD RULE   ADD GROUP

CANCEL   COPY

FIG. 5C

| Group Name |
| pasadena |

Default SAFE baileySAFE ▾

| ■ Telemetry Filter ↑ | Description |
|---|---|
| ☐ [Template] Directory reads | High Volume This filter captures directories that have had the list of files within them enumerated. This is a high |
| ☐ [Template] File reads | High Volume This filter captures all files that have been read. This is a high volume, template filter, so you'll want |
| ☐ [Template] Registry key opens | High Volume This filter captures registry keys opened. This is a high volume, template filter, so you'll want to ma |
| ☑ Anomaly activity | This captures anomaly detection rule hits |
| ☑ Authentication activity | All authentication activity captured |
| ☑ Connection activity | TCP and UDP network connection activity |
| ☑ Directory changes | Directories that have been created, deleted or renamed |
| ☑ Dll activity | DLLs that have been loaded by a particular process |

☑ Enable telemetry streaming for targets in this group

FIG. 6B

Edit 'pasadena'

Group Name
pasadena

Default SAFE baileySAFE

| ☒ Telemetry Filter ↑ | Description |
|---|---|
| ☑ Process activity | Strongly Recommended Processes that have been created, started or that have exited. |
| ☑ Registry key changes | Windows registry keys that have been created, deleted or renamed. |
| ☑ Registry key opens for Software/Foo | High Volume This filter captures registry keys opened. This is a high volume, template filter, so you'll want to make |
| ☑ Registry value changes | Windows registry values that have been set or deleted |
| ☑ Remote thread activity | Remote threads created using CreateRemoteThread API. This can be a precursor to injection, but also has legitim |
| ☑ Scheduled Tasks | References: MITRE ATT&CKT1053 Tactics: Execution, Persistence, Privilege Escalation Data sources: ETW (Micro |
| ☑ Service Execution (telemetry) | References: MITRE ATT&CKT1035 Tactics: Execution Data sources: ETW (Service Control Manager) |
| ☑ Windows Management Instrumentation | References: MITRE ATT&CKT1047 Tactics: Execution Data sources: ETW (Microsoft-Windows-WMI-Activity/Opera |

☑ Enable telemetry streaming for targets in this group

CANCEL  UPDATE

FIG. 6C

ENDPOINT SECURITY SYSTEMS AND METHODS WITH TELEMETRY FILTERS FOR EVENT LOG MONITORING

CROSS-REFERENCE TO RELATED APPLICATION(S)

This application claims a benefit of priority under 35 U.S.C. § 119(e) from U.S. Provisional Application No. 63/082,430, filed Sep. 23, 2020, entitled "ENDPOINT SECURITY SYSTEMS AND METHODS WITH TELEMETRY FILTERS FOR EVENT LOG MONITORING," the entire content of which is hereby fully incorporated by reference herein for all purposes.

TECHNICAL FIELD

This disclosure relates generally to data security. More particularly, this disclosure relates to endpoint security. Even more particularly, this disclosure relates to endpoint security systems, methods, and computer program products with telemetry filters for event processing.

BACKGROUND OF THE RELATED ART

Entities such as enterprises, government agencies, organizations, and so on may install agents or sensors on endpoints of their respective networks to collect and send behavioral data to a central database for analysis and possible remediation by an intrusion detection system, antivirus software, a network security analyst, an information technology (IT) professional, or the like. This is referred to in the network security industry as endpoint detection and response (EDR).

An endpoint refers to a remote computing device that communicates with a computer network with which it is connected. Examples of endpoints can include desktop computers, laptop computers, smartphones, tablet computers, servers, workstations, and so on. These remote computing devices represent vulnerable points of entry into their respective computer networks as they are where attackers execute code and exploit network vulnerabilities and where digital assets are encrypted, exfiltrated, or otherwise leveraged.

EDR solutions are designed to continuously monitor endpoints and respond to threats from the Internet. Once the behavioral data sent by the agents and/or sensors is stored in the central database, an EDR system can run analytics on the behavioral data, identify patterns in the behavioral data, detect anomalies in the patterns, and send alerts for remedial action or further investigation. An example EDR system is described in U.S. Patent Application Publication No. US 2021/0144178 A1, entitled "SYSTEMS AND METHODS OF INFORMATION SECURITY MONITORING WITH THIRD-PARTY INDICATORS OF COMPROMISE," which is incorporated by reference herein.

Endpoint behavioral data can come from various sources. For instance, applications and operating systems running on endpoints may use event logs to record important hardware and software actions. System administrators and network security analysts alike can use these event logs to troubleshoot issues. For example, an operating system running on an endpoint can track specific events in its log files, such as application installations, security management, system setup operations on initial startup, problems, or errors, and so on. An event log, therefore, is a detailed record of system, security and application notifications stored by an operating system for use by certain authorized users such as administrators to diagnose system problems and predict future issues.

For systems in the endpoint security space, a traditional way for event monitoring is to hard code a list of sources (e.g., event data providers) for an agent running on an endpoint to listen and stream the events from those sources. However, the amount of data that can be logged in the event log can be significant. Accordingly, there is room for innovations and improvements.

SUMMARY OF THE DISCLOSURE

This disclosure provides a solution for significantly reducing the amount of data that gets fed into an event manager of an endpoint security system. The solution also allows a user to customize what type of events that might be of interest to an endpoint or a group of endpoints, allowing the user to control not only the amount of event data being streamed for data security purposes, but also the type of event data that should be further evaluated by a detection engine.

Particularly, the solution includes telemetry filters which are evaluated in memory, at a low level of the detection engine. An authorized user (e.g., a system administrator, a network security analyst, a manager, etc.) can determine, for instance, through a target management tool of a main controller system running on a server machine, what telemetry filters should be enabled for an endpoint or a group of endpoints. The next time an endpoint connects to the main controller system, this information is passed to an enhanced endpoint agent on the endpoint. Based on what telemetry filters are enabled, a driver (or drivers) within the enhanced endpoint agent can listen to events of interest and send those events of interest (e.g., registry reads) to the enabled telemetry filters. Each telemetry filter further filters down the events (e.g., a subset of registry reads following a specific path). A detection filter can be applied to the output from a telemetry filter (e.g., applying a detection rule to the subset of registry reads following the specific path). A result from the detection filter can be presented to a user for review.

In this way, an endpoint security system implementing the solution disclosed herein is operable to selectively enable telemetry filters to further filter down events captured in an event log, which significantly reduces the amount of data that needs to be processed, for instance, by an event manager of the endpoint security system. Further, unlike the more centralized approach adopted by some EDR systems, the behavioral data and/or event data are not centrally stored and processed. Rather, events captured on an endpoint and thus filtered by selective telemetry filters on the endpoint, are processed on the endpoint. This allows detections to take place on the endpoint, further enhancing the performance of the endpoint security system.

In some embodiments, a method implementing the solution disclosed herein can comprising receiving, by an endpoint agent running on an endpoint, an instruction from a controller system (e.g., an EDR system, an endpoint security system, an endpoint protection system, etc.) to enable a selection of filters. The endpoint agent is enhanced with a plurality of features, including a kernel-level event tracing facility, an event manager, a persistence manager, and a detection engine.

The selection of filters can include a custom-built telemetry filter for a kernel-level event tracing facility on the endpoint agent. As a non-limiting example, the custom-built telemetry filter may implement a rule written in a domain-specific language.

The kernel-level event tracing facility is configured for logging kernel or application-defined events to a log file as the kernel or application-defined events are occurring. The kernel-level event tracing facility can be one of a plurality of sources configured for logging events of various types and for providing the events to the endpoint manager.

The kernel or application-defined events are streamed or otherwise provided from the log file to the event manager on the endpoint agent as the kernel or application-defined events are occurring. In turn, the event manager determines, from a plurality of enabled telemetry filters including the custom-built telemetry filter, which ones of the plurality of enabled telemetry filters are applicable to the kernel or application-defined events. The event manager may apply a set of telemetry filters to the kernel or application-defined events, the set of telemetry filters determined by the event manager as applicable to the kernel or application-defined events.

Application of selectively enabled telemetry filters entails evaluating those filters in memory. In some embodiments, the custom-built telemetry filter is represented as an expression tree. An interpreter can be invoked to interpret the expression tree in memory. To significantly increase the speed of processing, just-in-time compilation may be utilized to compile the expression tree into machine code just in time of execution. The machine code is executed natively in memory in an extremely fast manner.

The evaluation produces events of interest which are then provided to the detection engine. The detection engine, in turn, applies detection filters to the events of interest to detect possible threats to the endpoint. That is, this endpoint security detection takes place on the endpoint itself, as the events are occurring. In some cases, a result from the detection filters can be presented by the endpoint agent through a user interface for review by an authorized user such as a system administrator, a network security analyst, a manager, etc.

In some embodiments, the selection of filters can include a custom-built persistence filter for identifying a registry value of interest. The persistence manager is operable to apply the custom-built persistence filter to a persistence tree. The persistence tree represents registry values in a registry used by an operating system local to the endpoint agent. Application of the custom-built persistence filter to the persistence tree produces a registry value of interest. The persistence manager provides the registry value of interest to the detection engine which, in turn, applies detection filters to determine potential persistence attacks.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 2A and 2B show examples of a user interface of a filter management tool that can be used to create and manage various telemetry filters according to some embodiments disclosed herein.

FIGS. 4A-4C together show an example of editing a telemetry filter according to some embodiments disclosed herein.

FIGS. 5A-5C together show another example of editing a telemetry filter according to some embodiments disclosed herein.

FIG. 6B shows an example of a default set of telemetry filters that can be enabled for target endpoints in the group shown in FIG. 6A according to some embodiments disclosed herein.

FIG. 6C shows an example of a user interface through which telemetry filters can be enabled for target endpoints in a particular group.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1A:
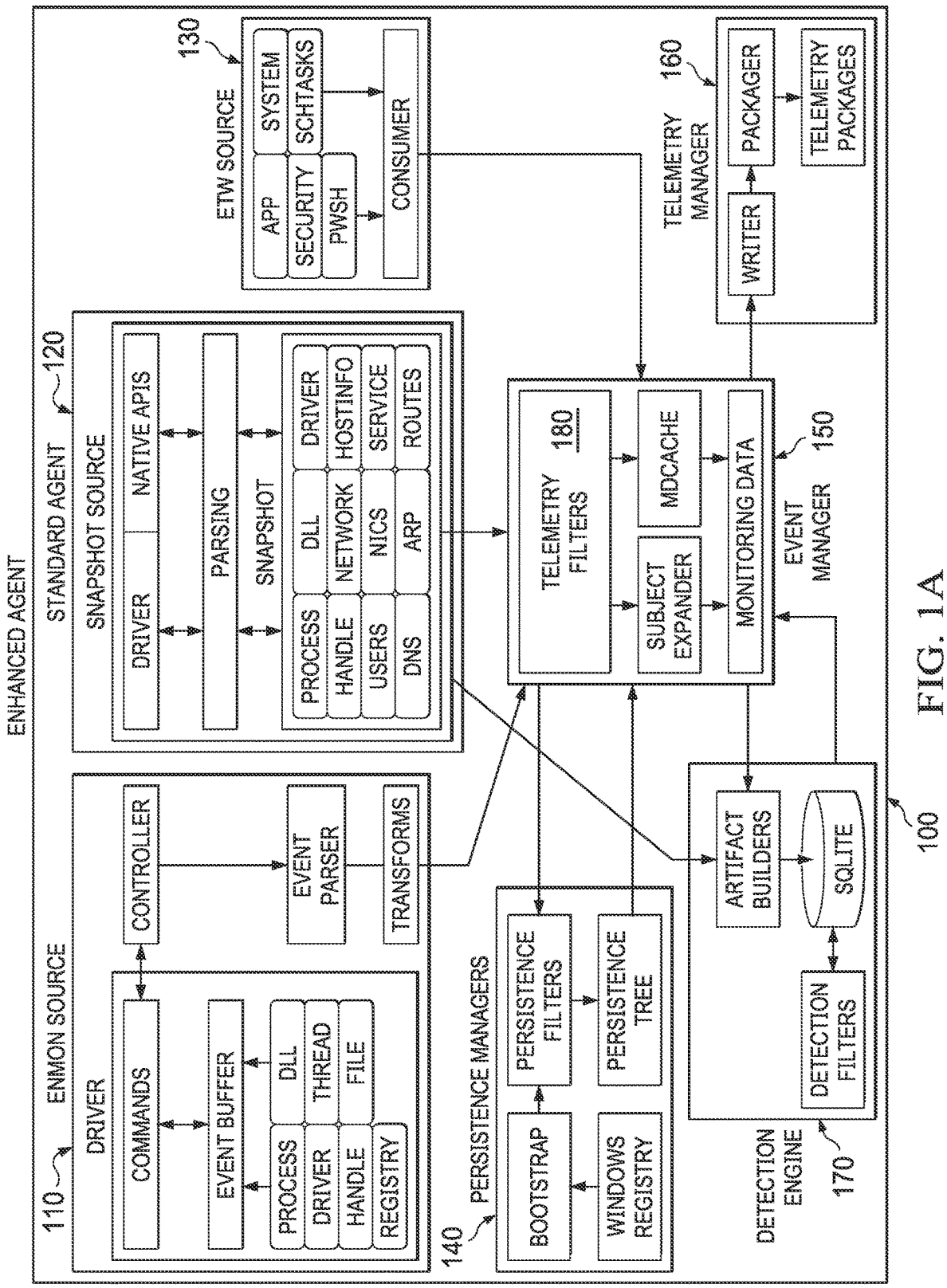
FIG. 1A is an architectural diagram that shows an example of an endpoint agent having various enhanced features, including telemetry filters according to some embodiments disclosed herein.

FIG. 1A is an architectural diagram that shows, as a non-limiting example, an endpoint agent 100 and its various components, including a plurality of sources of events. Different endpoint security systems, endpoint protection platforms, EDR systems, and the like may employ different endpoint agents to perform different functions. Generally, an endpoint agent is a small, lightweight background application or program that is installed at the operating system level on an endpoint of a computer network (e.g., an enterprise computer network) and that is programmed to collect and send behavioral data to a central database for analysis and possible remediation. However, as described below, embodiments of an endpoint agent disclosed herein are enhanced with several distinct features.

For example, as illustrated in FIG. 1A, enhanced endpoint agent 100 has a new event tracing source called Event Tracing for Windows (ETVV) source 130. Generally, ETW source 130 is a kernel-level event tracing facility (which is also referred to herein as an ETW provider) that can be used to log kernel or application-defined events to a log file.

From the data security perspective, an event log can have many different types of very valuable and interesting events. ETW source 130 is a new source of events. On a typical user machine (e.g., a corporate laptop computer), there can be over a thousand ETW providers. These ETW providers are written by MICROSOFT® and/or by third parties.

A traditional way to handle ETW data is by hard coding a fixed set of providers that should be listened to for event data and stream all of that event data to a server, with effectively no filters. At the server side, an analysist then searches that data for possible issues. Because the amount of event data that can be logged in the event log can be significant, this is not an efficient way to detect potential data security problems.

This disclosure provides a new approach in which event data of interest is captured from the event log and the detection is done on an endpoint itself. A user is provided with the ability to identify event data of interest. The system listens to different sources (e.g., different ETW providers), listens to different channels, and applies detection rules against filtered event data of interest. To this end, the term "rule" is used interchangeably in this disclosure with the term "filter," both of which refer to conditional logic that takes a particular action (or cause a certain action to be taken) when a condition is met. This conditional logic can be expressed as a complex Boolean structure.

In the example of FIG. 1A, ETW source 130 feeds event data into an event manager 150, which has a plurality of telemetry filters 180. In addition to ETW source 130, many other sources (e.g., enmon source 110, snapshot source 120, etc.) may stream event data to event manager 150 for processing. In turn, event manager 150 determines which enabled telemetry filters 180 match events in the event data and invokes an interpreter to dynamically evaluate those telemetry filters against the events to identify events of interest. The interpreter evaluates the applicable telemetry filters by interpreting them in memory as the events of interest are occurring. The in-memory evaluation is further described below.

Additionally, enhanced endpoint agent 100 has persistence managers 140 which employ persistence filters configured for filtering registry activities. Telemetry filters and persistence filters solve similar problems in that they both efficiently filter out unwanted event data. However, telemetry filters and persistence filters are configured for different purposes and telemetry filters perform at a level lower than persistence filters. Telemetry filters listen to changes as they are occurring, even before they get to persistence filters. Persistence managers and persistence filters are designed to find persistence on a machine.

In this disclosure, taking the security definition, the term "persistence" refers to a tactic used by attackers to establish a foothold on a machine and ensure that they keep access to the system on the machine across events that might interrupt access. Examples of events that may interrupt access include shutdowns and restarts, file deletion, credential changes, etc. Essentially, persistence is used to ensure that malware persists on a machine across reboots.

In some embodiments, a persistence manager is programmed to look through events that take place on a machine and monitor various types of persistence on the machine on a continuing basis and present that information to a user. The WINDOWS registry is huge with hundreds of thousands of registry keys and only perhaps a thousand or so registry keys that might be used for persistence. In the first, bootstrapping phase, the persistence manager may utilize persistence filters to identify specific registry values of interest (e.g., existing persistence). In the second, monitoring phase, the persistence manager is operable to identify each persistence attack as it occurs in real time. In some embodiments, this is done by utilizing a persistence tree which models a registry used by a local operating system (e.g., a WINDOWS registry). This registry, which can contain a collection of databases, is used by the local operating system to store configuration settings used by the local operating system. Some applications may also use the registry to store configuration settings. The persistence tree, which has an in-memory representation, is continuously updated to reflect changes to the keys in the registry.

Traditionally, a persistence manager uses a hard-coded list of registry keys to find existing persistence (in the first, bootstrapping phase and/or in the second, monitoring phase). A user has no way to update this list. Further, this hard-coded list of registry keys of interest can only run on one machine.

Some embodiments provide a user interface for presenting persistence filters. Some embodiments provide a user interface for creating/editing/managing persistence filters. Since new persistence attacks may be discovered at any given time, the ability for a user to quickly view, create, and/or edit persistence filters (e.g., by building a persistence rule that matches a particular registry value that represents a path that a malware wants executed) can increase the ability of the endpoint agent to timely detect persistence attacks and take immediate remediation action.

The enhanced endpoint agent disclosed herein has an engine that executes persistence filters (including built-in persistence filters and user-created, custom-built persistence filters). Compared to the hard-coded approach described above, persistence filters disclosed herein can be very adaptable, very flexible, and runtime configurable. A persistence filter thus created or modified (e.g., through a web-based user interface of a filter management tool) can be readily communicated or otherwise distributed to other endpoint agents on the computer network.

In the example of FIG. 1A, enhanced endpoint agent 100 also has a telemetry manager 160 and a detection engine 170. Telemetry manager 160 is adapted for writing output data into a telemetry package, which is communicated to the server side for analysis. Detection engine 170 employs detection filters to detect or otherwise find different bad things happening on a system (e.g., a malware, an advanced persistent threat, a malicious shell extension, an anomaly, etc.). As discussed above, detection filters implementing conditional logic can also be characterized as detection rules. Examples of detection rules and security definitions can be found in the above-referenced U.S. Patent Application Publication No. US 2021/0144178 A1.

In the detection engine, security definitions, which describe detection rules, can be compiled to SQL and executed on a telemetry database. To get results even faster, evaluation can be performed in memory as event data is coming through. Specifically, the input data is applied to a schema and a custom-built interpreter is invoked to interpret the input data.

In this case, telemetry filters can determine what event data is interesting from the security perspective. The telemetry filters allow for very precise control of getting event data of interest from an event log. A user can dynamically select event providers for monitoring based on what telemetry filters are enabled. The user can pick from out-of-the-box telemetry filters, or they can create their own telemetry filters.

For instance, certain custom applications operate in an enterprise computing environment and events from those applications are logged to a custom event tracing facility (e.g., an ETW provider). A user can build a telemetry filter for that custom event tracing facility and can precisely control what results from the advanced filtering.

This selectiveness can apply to persistence filters, as well as other filters employed by an endpoint agent disclosed herein. For instance, as a non-limiting example, suppose a class of persistence used to run code in a certain process is not of interest for endpoint security purposes, a user can, through a user interface provided by the endpoint security system, disable persistence filters corresponding to the class of persistence.

In the example of FIG. 1A, no hard-coded filters are used. Instead of looking for hard-coded information such as certain registry keys, telemetry filters (e.g., telemetry filters 180) are dynamically interpreted in memory. Such telemetry filters cannot be hard-coded or pre-compiled. As event data is occurring, the telemetry filters, which are represented as expression trees, are evaluated by interpreting these expression trees. In some embodiments, the processing speed of such evaluation can be significantly increased through just-in-time (JIT) compilation.

Figure 1B:
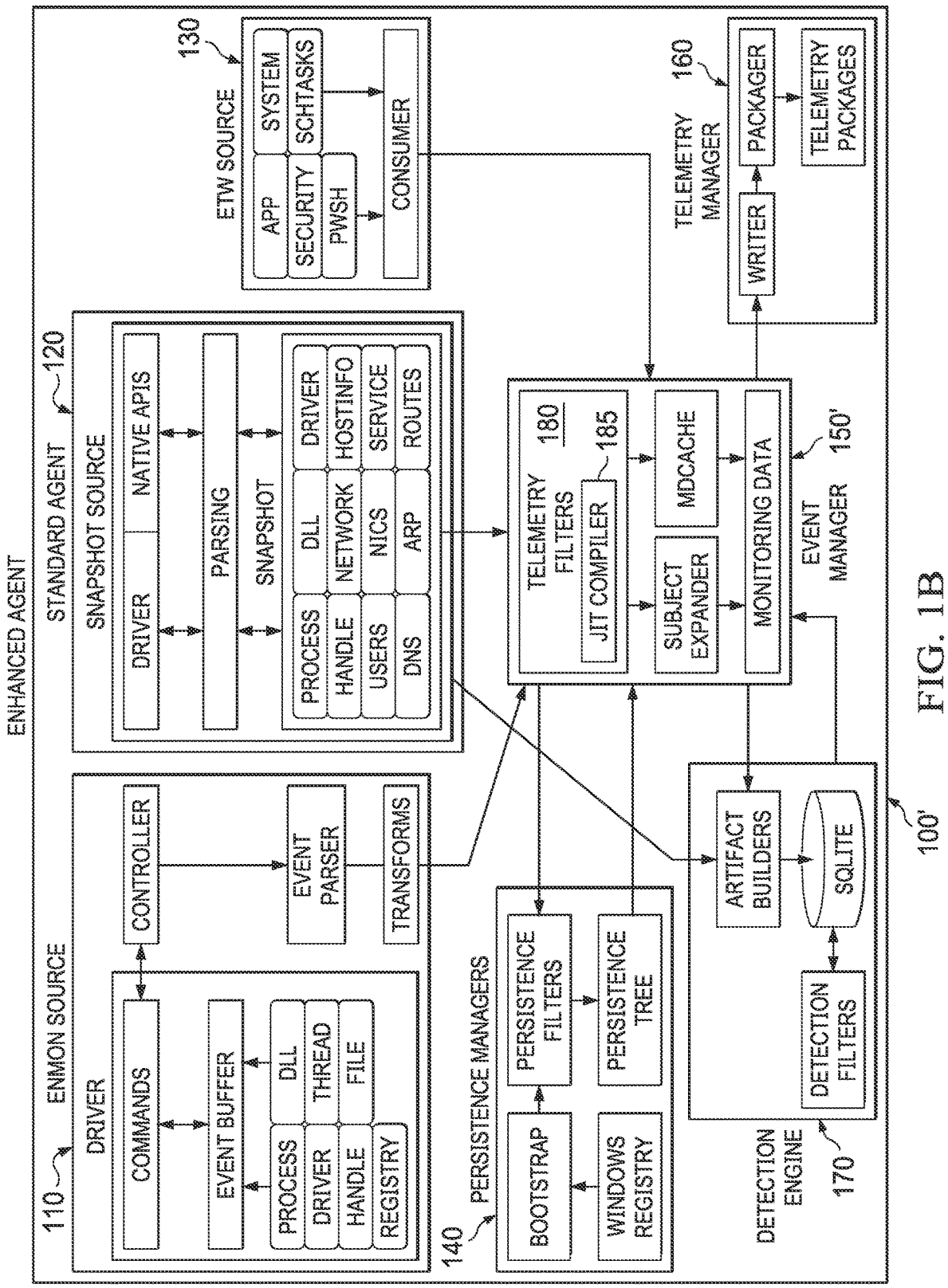
FIG. 1B is an architectural diagram that shows another example of an endpoint agent having various enhanced features, including a just-in-time compiler according to some embodiments disclosed herein.

FIG. 1B is an architectural diagram that shows another example of an endpoint agent having various enhanced features, including a JIT compiler according to some embodiments disclosed herein. In this example, endpoint agent 100' is further enhanced with JIT compiler 185. In computing, JIT compilation refers to a particular way of executing code in which compilation occurs at runtime during execution, as opposed to before execution. In this case, JIT compiler 185 is used to compile an expression tree, which represents a filter or rule, into machine code and execute that natively. Without JIT compiler 185, each filter evaluation involves interpretation of an expression tree, and this interpretation takes longer than executing machine code natively (native as to the underlying processor's instruction set).

At runtime, every event such as an operating system activity (e.g., a registry read, a file system read, a ETW event, etc.) flows through an in-memory evaluation performed by JIT compiler 185. In most cases, there could be several telemetry filters for each particular event type that would match the incoming event. All matching telemetry filters would need to be evaluated. JIT compiler 185 is operable to compile the expression trees representing the matching telemetry filters into machine code (e.g., byte code) and execute the byte code natively in an extremely fast manner.

Figure 1C:
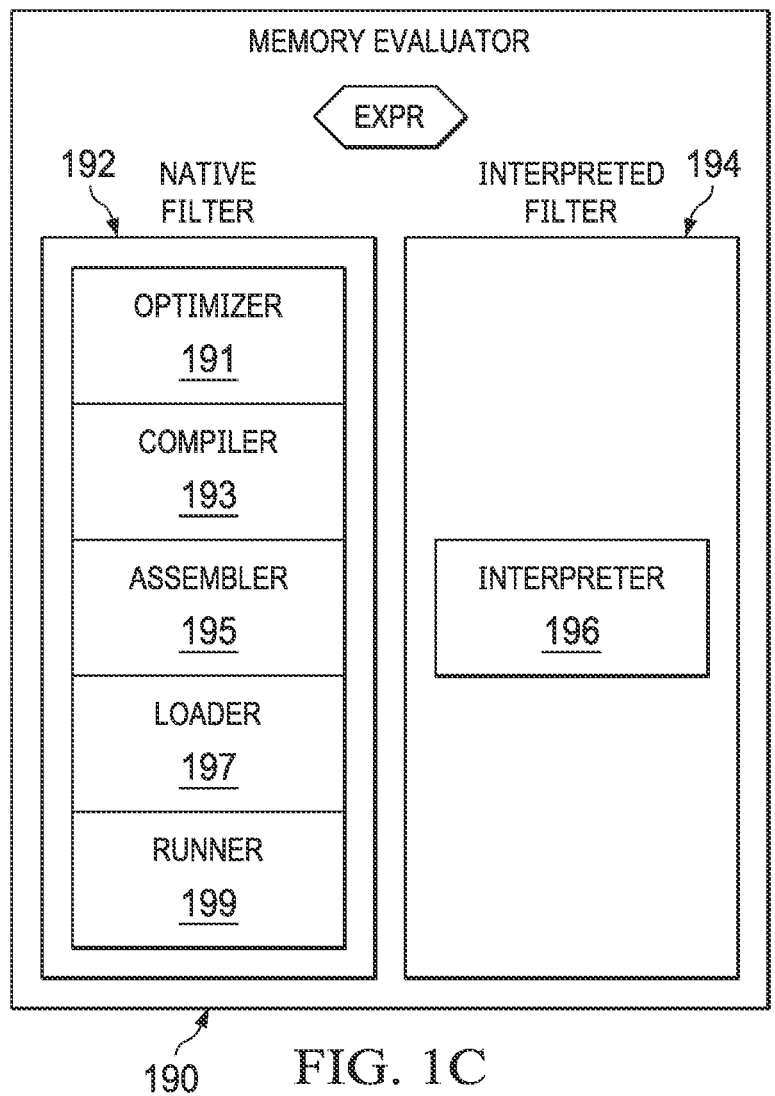
FIG. 1C is a block diagram that shows an example of a memory evaluator adapted for performing in-memory evaluation according to some embodiments disclosed herein.

In some embodiments, JIT compiler 185 can be implemented as part of an in-memory memory evaluator. FIG. 1C is a block diagram that shows an example of a memory evaluator 190 adapted for performing in-memory evaluation according to some embodiments disclosed herein. As a non-limiting example, Table 1 below shows the components of memory evaluator 190 and their corresponding responsibilities.

TABLE 1

| Component | Responsibility | Input | Output |
|---|---|---|---|
| Memory Evaluator 190 | Determine with a given expr matches the object of interest. Evaluation has a Build step, then a Match step. If the filter has not been built, try to initiate a Native Filter. If that fails (e.g., assembler does not support current platform), fall back to initializing an Interpreted Filter. Match a currently built filter against the input object. | expr, object | true/false |
| Native Filter 192 | Match an expr on an input object, leveraging native compilation. | expr, object | true/false |
| Optimizer 191 | Transform input expr into an optimized one. Use laws of Boolean algebra to simplify expr and/or rearrange it based on estimated operator cost. | expr | expr |
| Compiler 193 | Transform optimized expr into byte code - a.k.a. Intermediate Language (IL). | expr | byte code |
| Assembler 195 | Transform byte code into native code that can execute on the current platform. | byte code | native code |
| Loader 197 | Dynamically load native code into memory and return the virtual address of where the dynamic code is loaded. | native code | virtual address |
| Runner 199 | Given input object, populate parameter array and call function at virtual address. | virtual address, object | true/false |
| Interpreted Filter 194 | Match an expr on an input object using an interpreter | expr, object | true/false |
| Interpreter | Given input object, populate symbol table and | expr, object | true/false |

TABLE 1-continued

| Component | Responsibility | Input | Output |
|---|---|---|---|
| 196 | recursively reduce expr until the result is a Boolean. Internally, the interpreter is composed of a set of forms - each is responsible for reducing a single operator (e.g. StartsWith). | | |

Some embodiments of a system disclosed herein implement a domain-specific language (DSL). DSL is a computer language specialized in a particular application domain. DSL allows the use of an interpreter to interpret filters represented as expression trees. This interpreter can be embedded in a host application such as a regular expression engine.

A filter can be written in DSL and expressed in an expression tree. In the example of FIG. 1A, evaluating such a filter in memory at runtime involves an interpreter interpreting an expression tree representing the filter. In the example of FIG. 1B, evaluating such a filter in memory at runtime involves compiling such an expression tree into byte code and executing the byte code.

As alluded to above, a user can also quickly build a filter or a set of filters to react to a new threat. In some embodiments, a filter (e.g., a telemetry filter, a persistence filter, a detection filter, etc.) can be created and/or managed using a filter management tool. The filter management tool can be part of an endpoint security system, an endpoint protection system, an EDR system, or the like.

FIGS. 2A and 2B show examples of a user interface of a filter management tool 200 that can be used to create and manage (e.g., enable/disable) various telemetry filters, persistence filters, detection filters, etc. In some embodiments, the user interface can be a web-based interface with various functions for changing rules, adding rules, configuring what rules to enable for what endpoint, and so on. Through this filter management tool, the user has control on precisely what filters to run on which endpoint. The system can then synchronize user instructions to all endpoints.

To protect the system from inadvertently deploying a user-created filter or rule that might potentially cause harm to the system, some protection measures may be taken. For example, requiring a user-created filter or rule be tested on an endpoint first, sending a notification to an endpoint instead of sending the user-created filter or rule directly to the endpoint, etc.

Figure 3A:
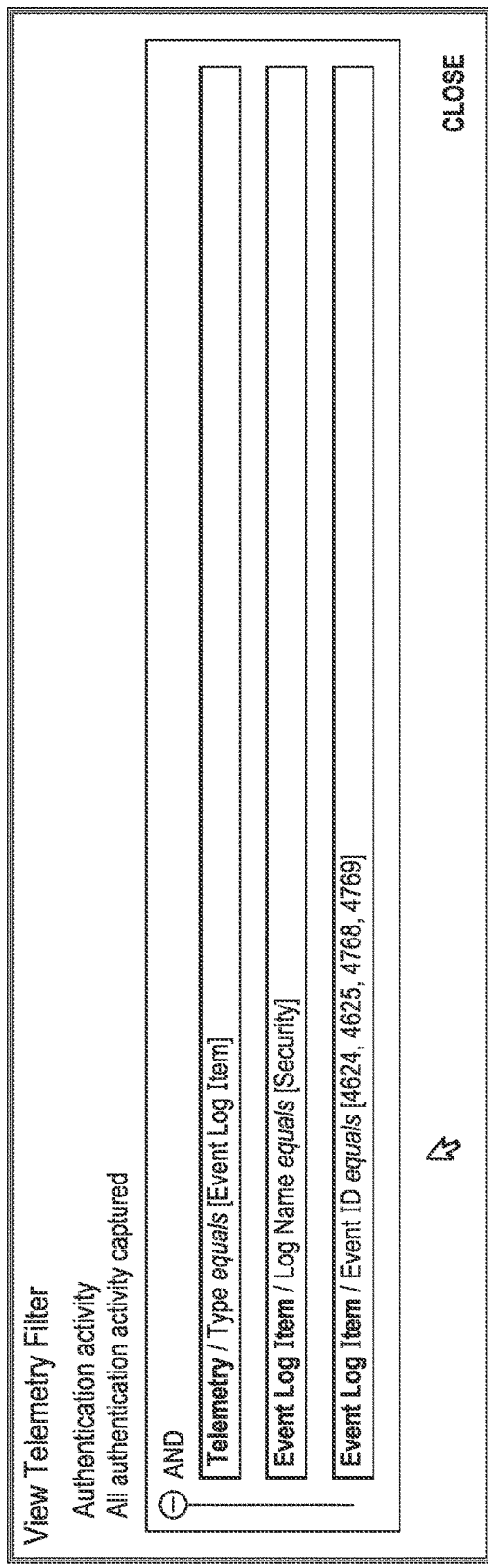
FIGS. 3A and 3B show examples of different telemetry filters according to some embodiments disclosed herein.
Figure 3B:
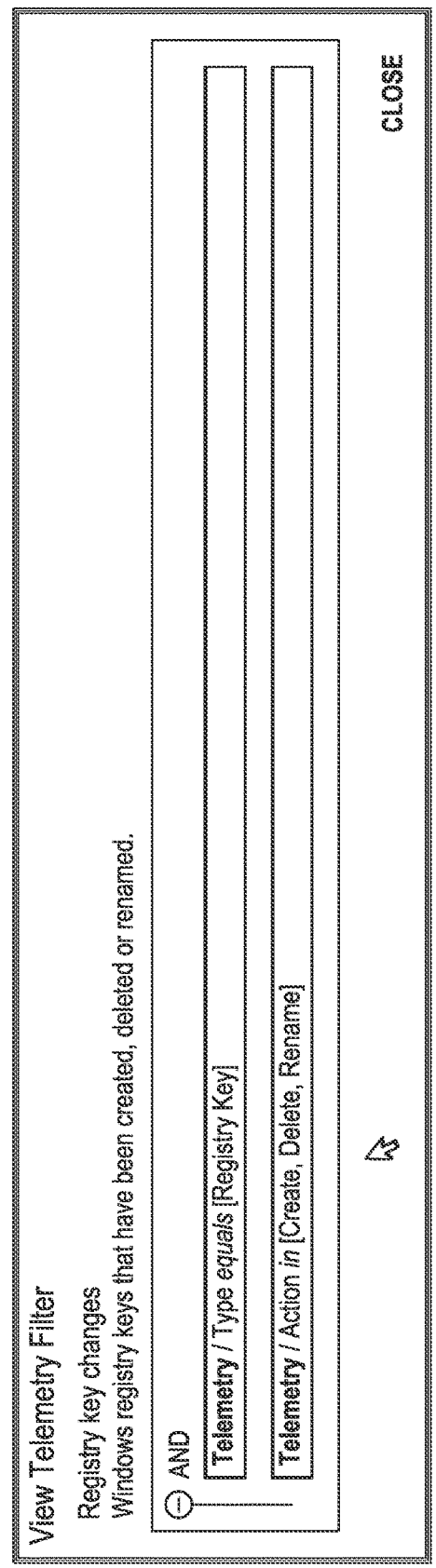

FIGS. 3A and 3B show examples of different telemetry filters. Particularly, FIG. 3A shows a basic telemetry filter 300 which indicates what a user interested in a security log is a specific event identifier (ID). FIG. 3B shows a medium-volume telemetry filter which indicates that a user is interested in registry key changes (e.g., creates, deletes, renames).

Figure 5A:
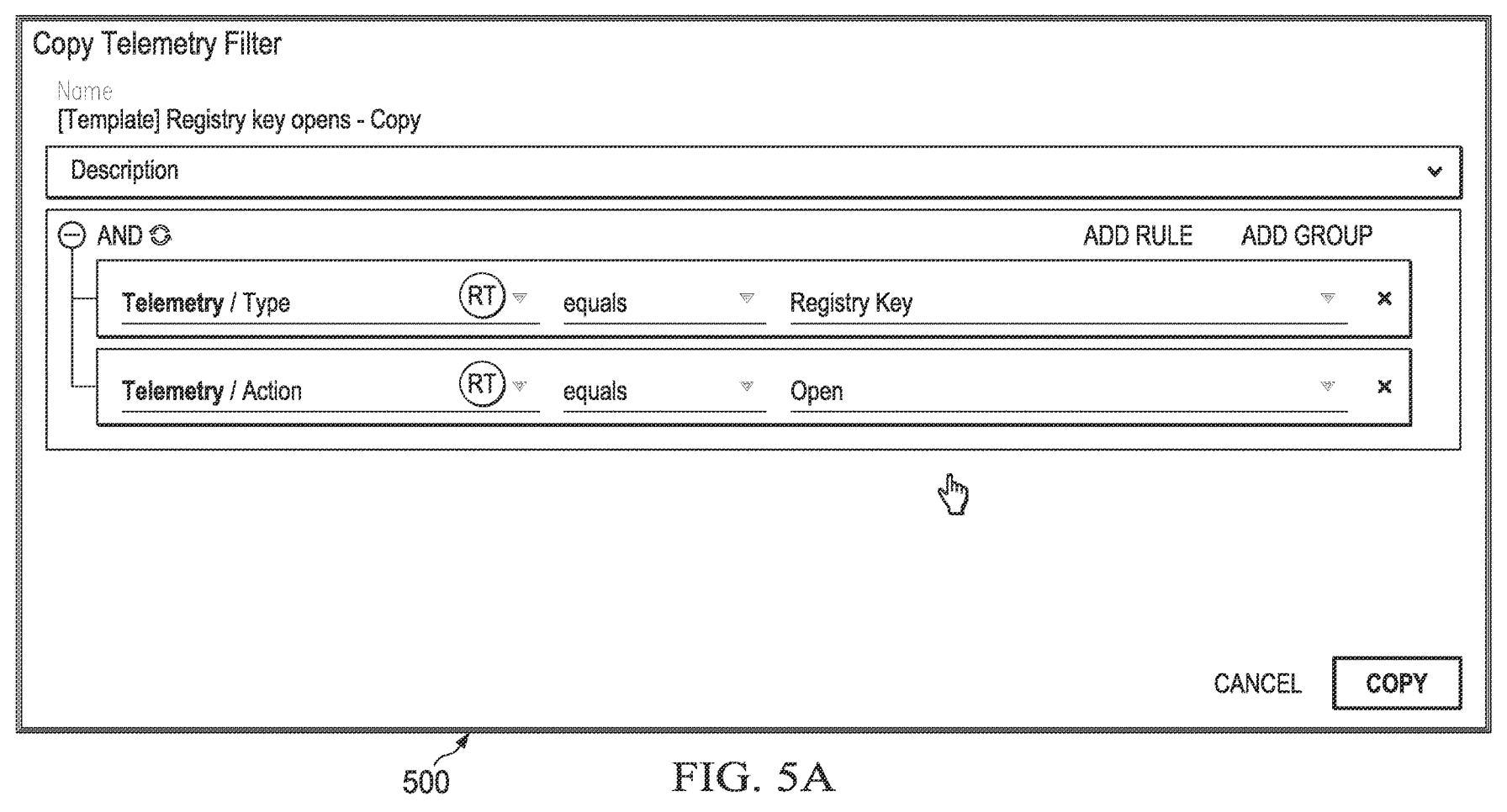
Figure 5B:
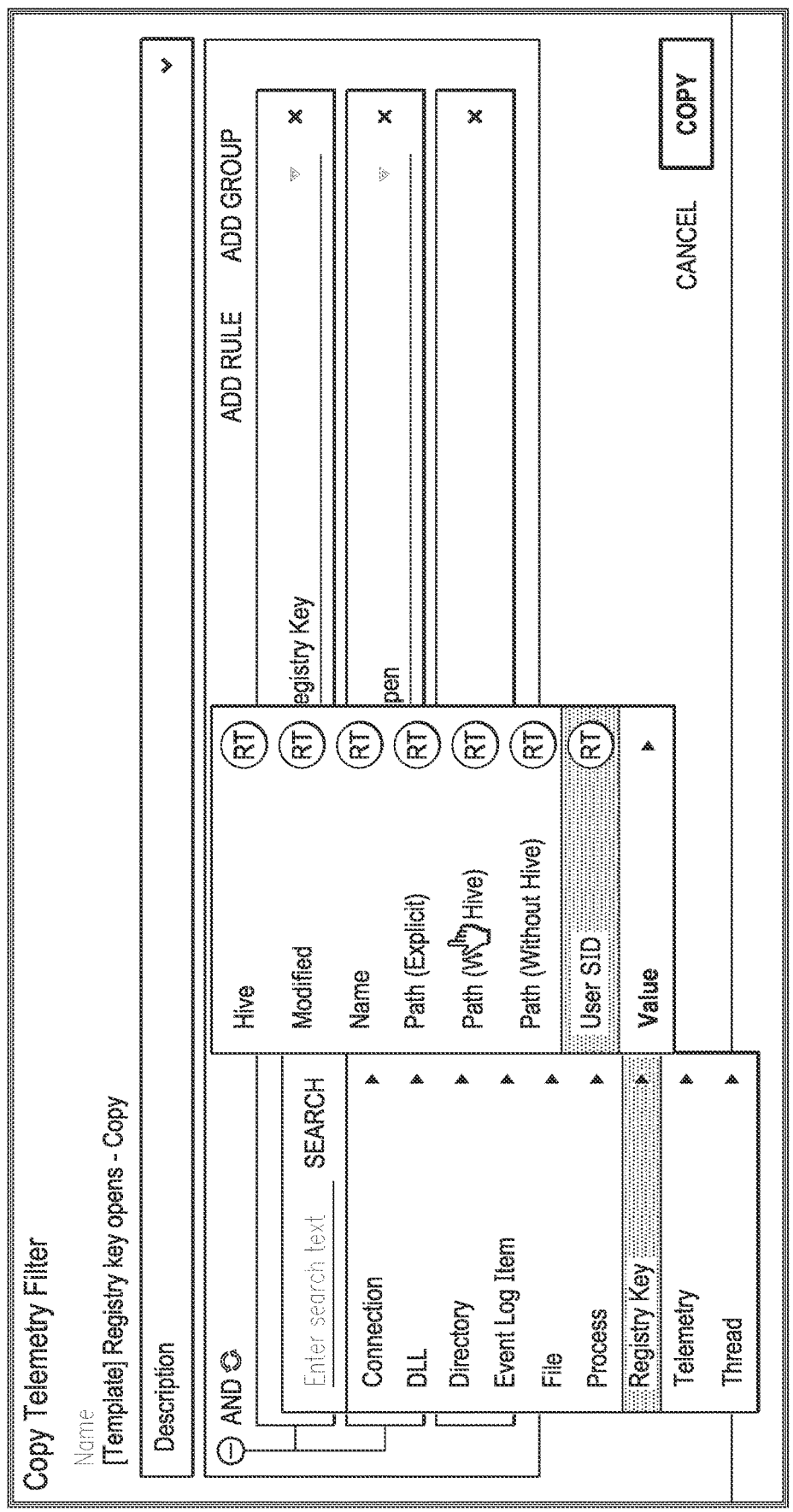

Through the Boolean logic built into the user interface of the filter management tool, the user can express and indicate to the system what type of data security events and actions are of interest to the user. FIGS. 4A-4C together show an example of a user interface 400 for editing a telemetry filter named "Authentication activity." Further, FIGS. 5A-5C together show an example of a user interface 500 for editing a telemetry filter named "Registry key opens".

As these examples illustrate, a telemetry filter can be defined by a type (e.g., "registry key") and action (e.g., "open"). In the example of FIG. 5C, the telemetry filter further specifies that the particular type and action must take place in a particular path. With a telemetry filter defined, a user can write a detection rule against that.

Telemetry filters are evaluated at a pretty low level of a detection engine (e.g., detection engine 170). If a user wants to view certain events, a telemetry filter has to be written correspondingly. The range of information that can be presented to the user is highly customizable.

For instance, if a user wants everything from an event log, a telemetry filter can be written to let everything through, and an agent will force everything to storage. This may be useful for a system where the data volume is not massive. In a high volume system, if a user does not want to be alerted every time something happens, a telemetry filter can be written to capture very specific events. The user has control over the amount and types of event data to evaluate for data security purposes.

Detection of certain types of events (e.g., credential access) can only be done through analyzing events logged in the operating system's event Log. Currently, if an organization wants to detect such events, the only way to do so is to stream all the event log data over to a server computer, which can take up a huge amount of storage space and time to be able to detect such events. Using telemetry filters can significantly reduce traffic and data storage.

In some cases, certain events can be very difficult to detect on an endpoint. For instance, credentials may be maintained centrally on the domain controller machines. The best way of detecting such events is through the authentication logs stored on the domain controller. An authentication may take place on the endpoint, but there is no trace of it on the endpoint's event log. However, the domain controller is involved in the authentication and the event is captured in the event log on the domain controller. Thus, in such scenarios, the only way to see the event is from the domain controller's perspective, which requires the authentication logs on the domain controller. The enhanced agent with the telemetry filters can also run on the domain controller.

Different endpoints can have different telemetry filters because different things are interesting to different endpoints. Telemetry filters are different in their expressive powers and how they are evaluated. A telemetry filter focuses on what is interesting, is evaluated at a lower level of the detection engine, and is evaluated in memory as data comes through. Unlike anomaly filters, a telemetry filter is built on a Boolean logic and does not model complex relationships, so it can be evaluated very fast. Anomaly filters can model more complex relationships because the detection engine is modeled on a graph database, using a graph schema to model the relationships.

Generally, a separate process is performed to analyze what telemetry filters are enabled. This is done through target management. In some embodiments, target management is how policies can be applied to different groups (e.g., entire IP ranges, subsets, hosts, etc.). In this case, groups are used to manage what are called targets which are basically a pattern for an endpoint.

Figure 6A:
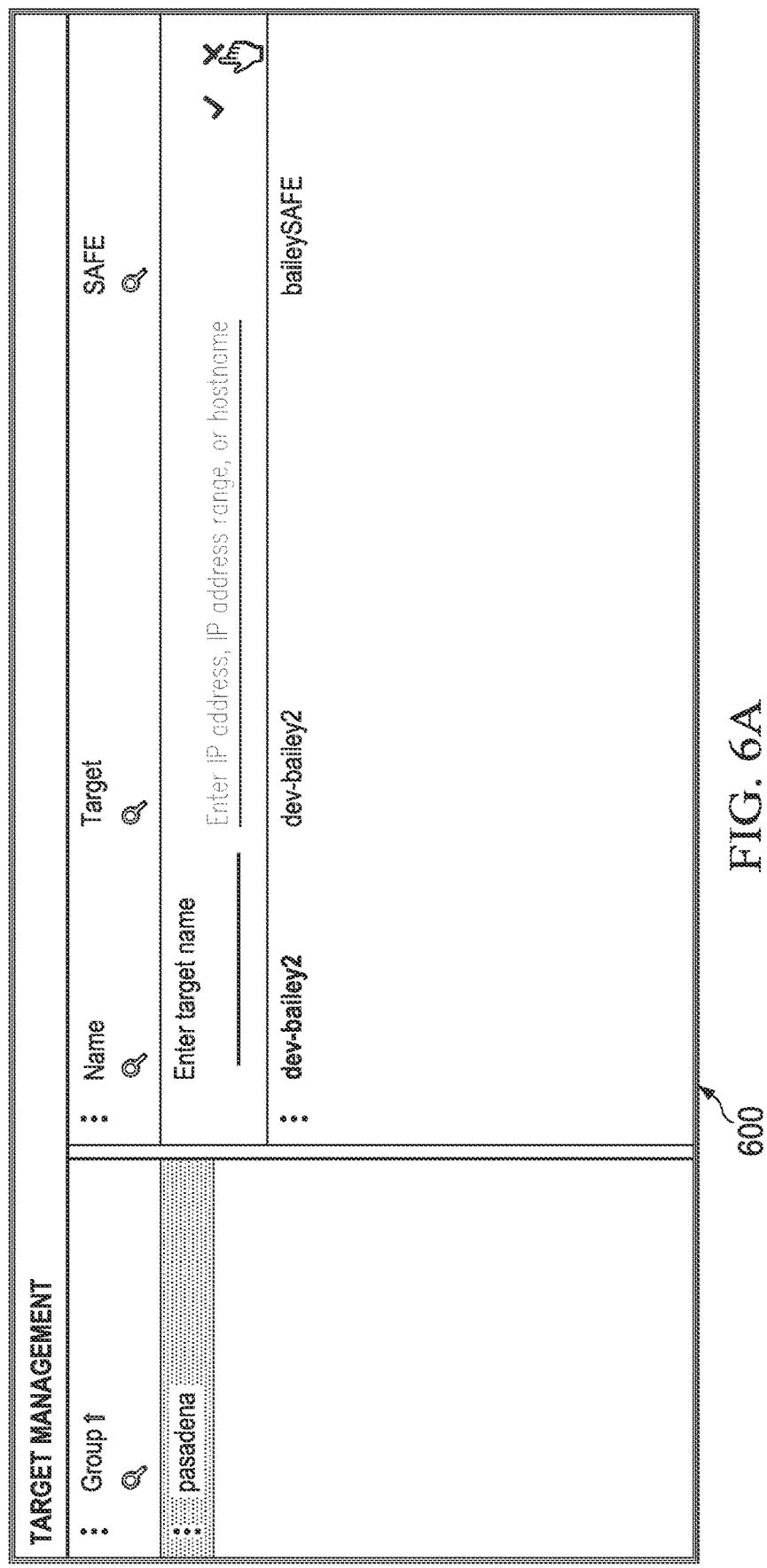
FIG. 6A shows an example of a user interface of a target management tool that can be used to enable certain telemetry filters for a group of end points according to some embodiments disclosed herein.

FIG. 6A shows an example of a user interface of a target management tool 600 that can be used to enable certain telemetry filters for all end points at a "Pasadena" group. FIG. 6B shows a set of default set of telemetry filters that can be enabled for targets (i.e., endpoints) in the group shown in FIG. 6A. Certain telemetry filters are not enabled by default because they may permit high volume traffic. FIG. 6C shows that an authorized user such as an administrator, a network security analyst, a manager, etc. has enabled all of the telemetry filters for the targets in the particular group. ETW source 130 dynamically determines which ETW providers to listen to by analyzing all enabled telemetry filters.

Based on what is enabled, events from the providers are monitored and passed to the enabled telemetry filters. For example, a telemetry filter is for "Registry key opens for Software/Foo." The registry can capture registry key opens for Software/Foo and read to the telemetry filter from the kernel mode.

There can be different telemetry filters for the registry. For instance, another telemetry filter is for "Registry key changes" (e.g., all creates, deletes, and renames). This is a medium-volume telemetry filter. If a telemetry filter for registry reads is enabled, the system analyzes the enabled telemetry filter and indicates (e.g., through the enhanced agent the next time the endpoint is connected to the system) to the kernel mode component (e.g., a driver) to listen for registry reads. This analysis is performed on the server side—the system will analyze all the telemetry filters that were chosen for this group.

Technically, the system could take all that data coming through and apply all of the telemetry filters to the data, and it will work. However, a goal here is to reduce the traffic in and out of the system and the amount of data streaming through each of these components because they are heavily used. Customization of telemetry filters allows a precise control over what gets processed (e.g., enabling registry reads, file system writes, driver loads, but not thread access). In this way, a kernel mode component (e.g., a driver) can know specifically what events it needs to monitor for and then only those events that could possibly match may get through to the telemetry filters. The filtering is applied on the enhanced agent without help from the server.

If enabled, the results from the telemetry filters will get logged by a telemetry manager (e.g., telemetry manager 160) to a telemetry packager and shipped over (e.g., in a telemetry package) to the server side so that an analyst can review it in an ad hoc fashion through searching. Additionally or alternatively, a detection filter can be applied to a subset of what is captured by the telemetry filters to make a detection for review at the server side.

Accordingly, the first-pass filtering (e.g., type and action) is done on the source level (e.g., snapshot source, ETW source, etc.) where the system indicates to each source what type of events it should monitor. At this level, no complex filtering is performed because doing so in the kernel mode is against established best practices and may end up crashing the machine. The number of sources can be added/extended and is not limited to what is shown in FIG. 1A or FIG. 1B. The second-pass filtering is performed through telemetry filters, as discussed above.

Once passed through telemetry filters, an event manager can augment that data with additional information. Often, in the kernel mode, limited metadata is provided for filtering (e.g., User SID). Thus, the subject expander can augment that data (e.g., event timeline) coming through the telemetry filters by adding information such as Username so that complex detection filters can be written if necessary.

A primary purpose of metadata caching ("mdcache") is for file system metadata, which can be used to avoid saturating the input/output on the system. For instance, if file change monitoring (e.g., using hashing) is enabled, then file changes are fed into the metadata cache (e.g., this file has changed, so no need to read it again or hash it again). Coming from the kernel mode, an event may only have a process ID and a thread ID. Through the subject expander, information about the subject of the event (e.g., the process name and some basic process metadata) can be added and cached.

Subsequently, data either can go to the telemetry manager or the detection engine where detection filters are evaluated. Results from detection filters are then presented (e.g., through a user interface) for review.

Figure 7:
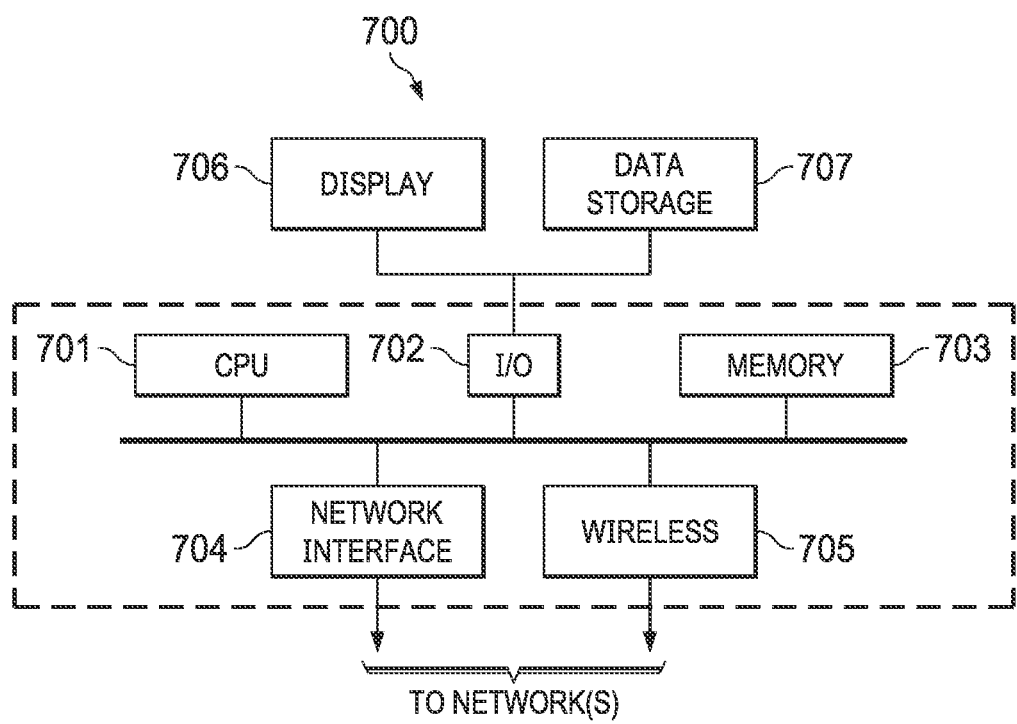
FIG. 7 depicts a diagrammatic representation of a data processing system for implementing an embodiment disclosed herein.

FIG. 7 depicts a diagrammatic representation of a data processing system for implementing an embodiment disclosed herein. As shown in FIG. 7, data processing system 700 may include one or more central processing units (CPU) or processors 701 coupled to one or more user input/output (I/O) devices 702 and memory devices 703. Examples of I/O devices 702 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to other computers or devices through network interface 704, wireless transceiver 705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, particularly DSL. Other software/hardware/network architectures may be used, including programming languages such as C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
    receiving, by an endpoint agent running on an endpoint, an instruction from a controller system to enable a selection of filters, the selection of filters including a custom-built telemetry filter for a kernel-level event tracing facility of the endpoint agent and a custom-built persistence filter for identifying a registry value of interest, the kernel-level event tracing facility configured for logging kernel or application-defined events to a log file as the kernel or application-defined events are occurring, the endpoint agent having a plurality of features, including the kernel-level event tracing facility, an event manager, and a detection engine;
    streaming, by the endpoint agent, the kernel or application-defined events from the log file to the event manager of the endpoint agent as the kernel or application-defined events are occurring;
    determining, by the event manager from a plurality of enabled telemetry filters including the custom-built telemetry filter, which ones of the plurality of enabled telemetry filters are applicable to the kernel or application-defined events;
    applying, by the event manager, a set of telemetry filters to the kernel or application-defined events, the set of telemetry filters determined by the event manager as applicable to the kernel or application-defined events, the applying comprising evaluating the set of telemetry filters in memory, the evaluating producing events of interest which are a subset of the kernel or application-defined events;
    applying, by a persistence manager, the custom-built persistence filter to a persistence tree, the persistence tree representing registry values in a registry used by an operating system local to the endpoint agent, the applying producing a registry value of interest;
    providing the registry value of interest to the detection engine for evaluation; and
    presenting, by the endpoint agent through a user interface, the events of interest and an evaluation result from the detection engine.

2. The method according to claim 1, further comprising: dynamically listening for any event tracing sources by analyzing the plurality of enabled telemetry filters.

3. The method according to claim 1, wherein the custom-built telemetry filter is represented as an expression tree and wherein the evaluating comprises invoking an interpreter and interpreting the expression tree in memory.

4. The method according to claim 1, wherein the custom-built telemetry filter is represented as an expression tree and wherein the evaluating comprises performing a just-in-time compilation to compile the expression tree into machine code and execute the machine code in memory.

5. The method according to claim 1, wherein the custom-built telemetry filter implements a Boolean logic for efficient filtering of high volume events.

6. A system, comprising:
    a processor;
    a non-transitory computer-readable medium; and
    stored instructions translatable by a processor to implement an endpoint agent on an endpoint, the endpoint agent having a plurality of features, including a kernel-level event tracing facility, an event manager, and a detection engine, the endpoint agent configured for:
        receiving an instruction from a controller system to enable a selection of filters, the selection of filters including a custom-built telemetry filter for the kernel-level event tracing facility of the endpoint agent and a custom-built persistence filter for identifying a registry value of interest, the kernel-level event tracing facility configured for logging kernel or application-defined events to a log file as the kernel or application-defined events are occurring;
        streaming the kernel or application-defined events from the log file to the event manager of the endpoint agent as the kernel or application-defined events are occurring;
        determining, by the event manager from a plurality of enabled telemetry filters including the custom-built telemetry filter, which ones of the plurality of enabled telemetry filters are applicable to the kernel or application-defined events;
        applying, by the event manager, a set of telemetry filters to the kernel or application-defined events, the set of telemetry filters determined by the event manager as applicable to the kernel or application-defined events, the applying comprising evaluating the set of telemetry filters in memory, the evaluating producing events of interest which are a subset of the kernel or application-defined events;
        applying, by a persistence manager, the custom-built persistence filter to a persistence tree, the persistence tree representing registry values in a registry used by an operating system local to the endpoint agent, the applying producing a registry value of interest;
        providing the registry value of interest to the detection engine for evaluation; and
        presenting, by the endpoint agent through a user interface, the events of interest and an evaluation result from the detection engine.

7. The system of claim 6, wherein the stored instructions are further translatable by the processor to dynamically listen for any event tracing sources by analyzing the plurality of enabled telemetry filters.

8. The system of claim 6, wherein the custom-built telemetry filter is represented as an expression tree and wherein the evaluating comprises invoking an interpreter and interpreting the expression tree in memory.

9. The system of claim 6, wherein the custom-built telemetry filter is represented as an expression tree and wherein the evaluating comprises performing a just-in-time compilation to compile the expression tree into machine code and execute the machine code in memory.

10. The system of claim 6, wherein the custom-built telemetry filter implements a Boolean logic for efficient filtering of high volume events.

11. A computer program product comprising a non-transitory computer-readable medium storing instructions translatable by a processor to implement an endpoint agent on an endpoint, the endpoint agent having a plurality of features, including a kernel-level event tracing facility, an event manager, and a detection engine, the endpoint agent configured for:
- receiving an instruction from a controller system to enable a selection of filters, the selection of filters including a custom-built telemetry filter for the kernel-level event tracing facility of the endpoint agent, the kernel-level event tracing facility configured for logging kernel or application-defined events to a log file as the kernel or application-defined events are occurring;
- streaming the kernel or application-defined events from the log file to the event manager of the endpoint agent as the kernel or application-defined events are occurring;
- determining, by the event manager from a plurality of enabled telemetry filters including the custom-built telemetry filter, which ones of the plurality of enabled telemetry filters are applicable to the kernel or application-defined events;
- applying, by the event manager, a set of telemetry filters to the kernel or application-defined events, the set of telemetry filters determined by the event manager as applicable to the kernel or application-defined events, the applying comprising evaluating the set of telemetry filters in memory, the evaluating producing events of interest which are a subset of the kernel or application-defined events;
- applying, by a persistence manager, the custom-built persistence filter to a persistence tree, the persistence tree representing registry values in a registry used by an operating system local to the endpoint agent, the applying producing a registry value of interest;
- providing the registry value of interest to the detection engine for evaluation; and
- presenting, by the endpoint agent through a user interface, the events of interest and an evaluation result from the detection engine.

12. The computer program product of claim 11, wherein the instructions are further translatable by the processor to dynamically listen for any event tracing sources by analyzing the plurality of enabled telemetry filters.

13. The computer program product of claim 11, wherein the custom-built telemetry filter is represented as an expression tree and wherein the evaluating comprises invoking an interpreter and interpreting the expression tree in memory.

14. The computer program product of claim 11, wherein the custom-built telemetry filter is represented as an expression tree and wherein the evaluating comprises performing a just-in-time compilation to compile the expression tree into machine code and execute the machine code in memory.

15. The computer program product of claim 11, wherein the selection of filters comprises a custom-built persistence filter for identifying a registry value of interest.

16. The computer program product of claim 15, wherein the endpoint agent further comprises a persistence manager configured for:
- applying the custom-built persistence filter to a persistence tree, the persistence tree representing registry values in a registry used by an operating system local to the endpoint agent, the applying producing a registry value of interest; and
- providing the registry value of interest to the detection engine.

* * * * *